(12) United States Patent
Jiang et al.

(10) Patent No.: US 11,057,315 B1
(45) Date of Patent: Jul. 6, 2021

(54) GENERATING A SCALING PLAN FOR EXTERNAL SYSTEMS DURING CLOUD TENANT ONBOARDING/OFFBOARDING

(71) Applicant: INTERNATIONAL BUSINESS MACHINES CORPORATION, Armonk, NY (US)

(72) Inventors: Jing Bo Jiang, Beijing (CN); Li Jiang, Beijing (CN); Li Ni Zhang, Beijing (CN); Wen Rui Zhao, Beijing (CN); Lan Luo, Beijing (CN); Yu Zhao, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/734,919

(22) Filed: Jan. 6, 2020

(51) Int. Cl.
*H04L 12/927* (2013.01)
*H04L 12/911* (2013.01)
*H04L 29/08* (2006.01)

(52) U.S. Cl.
CPC ............ *H04L 47/80* (2013.01); *H04L 47/826* (2013.01); *H04L 67/10* (2013.01)

(58) Field of Classification Search
CPC ........ H04L 47/80; H04L 47/826; H04L 67/10
USPC ....................................................... 709/226
See application file for complete search history.

(56) References Cited

U.S. PATENT DOCUMENTS

| 8,966,085 | B2 | 2/2015 | Abuelsaad | |
|---|---|---|---|---|
| 9,727,332 | B2 | 8/2017 | Kodali | |
| 9,871,745 | B2 * | 1/2018 | Steinder | H04L 67/16 |
| 10,225,140 | B2 | 3/2019 | Subramani Nadar | |
| 10,270,711 | B2 | 4/2019 | Chen | |
| 10,855,620 | B2 * | 12/2020 | Mordani | H04L 47/827 |

(Continued)

FOREIGN PATENT DOCUMENTS

| CN | 104657411 A | 5/2015 |
|---|---|---|
| WO | 2020000175 A1 | 1/2020 |

OTHER PUBLICATIONS

Shen, Zhiming et al.; Cloudscale: Elastic Resource Scaling for Multi-Tenant Cloud Systems; Proceedings of the 2nd ACM Symposium on Cloud Computing; Oct. 26-28, 2011; 14 pages.

(Continued)

*Primary Examiner* — Frantz B Jean
(74) *Attorney, Agent, or Firm* — Schmeiser, Olsen & Watts; Maeve M. Carpenter (57) ABSTRACT

An approach is provided for generating a scaling plan. Plans for onboarding first tenant(s) a cloud computing environment and offboarding second tenant(s) of the cloud computing environment are received. Historical data about behavior of tenants of the cloud computing environment is received. Based on the received plans and the historical data, a scaling plan for scaling computer resources of external systems during the onboarding and the offboarding is generated. The scaling plan specifies a timeline indicating dates and times at which changes in workloads associated with the external systems are required for the onboarding and the offboarding. Based on the scaling plan, a scaling is determined to be needed for computer resource(s) of one of the external systems. Responsive to determining that the scaling is needed, the scaling for the computer resource(s) is triggered at a date and a time indicated by the timeline.

20 Claims, 6 Drawing Sheets

(56) References Cited

U.S. PATENT DOCUMENTS

| | | | |
|---|---|---|---|
| 2015/0067126 A1* | 3/2015 | Madani | H04L 41/0853 |
| | | | 709/223 |
| 2015/0149608 A1 | 5/2015 | Kodali | |
| 2015/0149618 A1 | 5/2015 | Kodali | |
| 2016/0211961 A1 | 1/2016 | Gaurav | |
| 2016/0094473 A1* | 3/2016 | Mordani | G06F 16/27 |
| | | | 709/226 |
| 2016/0094624 A1* | 3/2016 | Mordani | H04L 67/42 |
| | | | 709/203 |
| 2018/0089258 A1 | 3/2018 | Bhattacharjee | |
| 2018/0210763 A1* | 7/2018 | Kumar | G06F 9/505 |
| 2019/0014060 A1* | 1/2019 | Mordani | G06F 9/5072 |
| 2019/0123967 A1* | 4/2019 | Dotchkoff | H04L 67/12 |
| 2020/0125542 A1* | 4/2020 | Purushothaman | G06F 16/211 |
| 2021/0044503 A1 | 2/2021 | Zhang | |

OTHER PUBLICATIONS

Notification of Transmittal of the International Search Report and the Written Opinion of the International Searching Authority, of the Declaration; International application No. PCT/IB2020/062158; International filing date Dec. 18, 2020; dated Mar. 30, 2021; 9 pages.

* cited by examiner

FIG. 6

GENERATING A SCALING PLAN FOR EXTERNAL SYSTEMS DURING CLOUD TENANT ONBOARDING/OFFBOARDING

BACKGROUND

The present invention relates to computer resource management in a cloud computing environment, and more particularly to predicting computer resource scaling requirements and scheduling computer resource scaling for external systems during tenant onboarding and/or offboarding in a cloud computing environment.

Multi-tenant cloud computing architecture allows consumers to share resources in a public, private, or hybrid cloud. Known cloud management platforms that support multi-tenant onboarding and offboarding require an ability to interface with a variety of external dependent systems. Hereinafter, external dependent systems are referred to simply as external systems. Some of the external systems are not designed to scale well without a cloud management platform having advance awareness of the workload caused by tenant onboarding and offboarding. Known cloud management platforms do not provide an effective scaling approach for computer resources required by the external systems because predicting the workload impact is difficult to understand, calculate, and/or predict when large numbers of users are onboarding to the cloud platform. Known monitor-based scaling out and scaling in approaches for the external systems do not avoid service down results and provide poor user experience due to a failure to handle a bursting user workload in a timely manner. Known cloud management platforms provide an inflexible, inconsistent, and/or non-repeatable approaches for managing computer resources required by external systems during onboarding and offboarding of multiple cloud tenants.

SUMMARY

In one embodiment, the present invention provides a method of generating a scaling plan. The method includes receiving, by one or more processors, plans for onboarding first one or more tenants of a cloud computing environment and offboarding second one or more tenants of the cloud computing environment. The method further includes receiving, by the one or more processors, historical data about behavior of tenants of the cloud computing environment. The method further includes based on the received plans for the onboarding and the offboarding and based on the historical data, generating, by the one or more processors, a scaling plan for scaling computer resources of external systems during the onboarding and the offboarding. The scaling plan specifies a timeline indicating dates and times at which changes in workloads associated with the external systems are required for the onboarding and the offboarding. The method further includes based on the scaling plan, determining, by the one or more processors, that a scaling is needed for one or more computer resources of an external system included in the external systems. The method further includes in response to the determining that the scaling is needed, triggering, by the one or more processors, the scaling for the one or more computer resources of the external system at a date and a time indicated by the timeline.

The aforementioned embodiment advantageously provides a flexible, consistent, and repeatable approach for estimating and predicting changes in workloads of various external systems during onboarding and offboarding of cloud tenants for multiple times on a timeline, scheduling scaling in and/or scaling out actions to address the predicted workload changes by providing changes in computer resources available to the external systems, and generating a scale execution plan for executing the scaling in and scaling out actions at the times specified in the timeline.

In one optional aspect of the aforementioned embodiment, the method further includes subsequent to the triggering the scaling for the one or more computer resources of the external system, receiving, by the one or more processors, a new plan for onboarding or offboarding a tenant of the cloud computing environment. The method further includes receiving, by the one or more processors, other historical data about behavior of the tenant. The method further includes based on the received new plan for the onboarding and the offboarding of the tenant and based on the other historical data, generating, by the one or more processors, a second scaling plan for scaling the computer resources of the external systems during the onboarding or the offboarding of the tenant. The method further includes based on the second scaling plan, determining, by the one or more processors, that a scaling is needed for one or more computer resources of a second external system included in the external systems. The aforementioned aspect advantageously provides a proactive approach for generating a scale execution plan for a new onboarding of offboarding plan based on historical data.

In another optional aspect of the aforementioned embodiment, the triggering the scaling for the one or more computer resources of the external system at the date and the time indicated by the timeline includes ensuring a performance of a cloud management platform exceeds a first threshold and a user experience associated with the cloud management platform exceeds a second threshold. The aforementioned aspect advantageously provides a scale plan generation approach that avoids the service down condition and poor user experience associated with the known monitoring-based scaling techniques.

Other embodiments of the present invention provide a computer program product and a computer system that employ respective methods analogous to the method described above. The advantages of the method described above also apply to the computer program product and computer system embodiments of the present invention.

DETAILED DESCRIPTION

Overview

Known cloud management platforms implemented for multi-tenant onboarding and offboarding may employ passive, monitoring-based scaling out and scaling in of computer resources, where the monitoring-based scaling fails to handle a breaking or bursting workload in a timely manner to avoid service down conditions and a poor user experience.

Embodiments of the present invention address the aforementioned unique challenges of scaling computer resources of external systems during multi-tenant onboarding and offboarding. In one embodiment, an impact analysis component predicts a workload impact to each external system of a cloud computing environment and generates scaling requirements for the external systems. In one embodiment, the impact analysis component allows an orchestration engine to use the predicted scaling requirements to proactively perform scaling in and/or scaling out of computer resources of the external systems during customer onboarding, offboarding, or a combination of onboarding and offboarding to a cloud computing environment.

In one embodiment, the impact analysis component uses project onboarding and offboarding timelines, onboarding and offboarding requirements, design documents, and historical data about prior onboarding and offboarding behavior by tenants to (i) generate predictions of impacts on workloads associated with the external systems, (ii) determine a schedule of dates and times for scaling out or scaling in for each of the external systems based on the predicted workload impacts, and (iii) generate a scaling execution plan to trigger scaling out or scaling in for each of the external systems according to the schedule. Embodiments of the present invention provide a flexible, consistent, and repeatable approach for proactively handling large workloads to various external systems during onboarding, offboarding, or a combination of onboarding and offboarding of multiple cloud tenants.

The aforementioned design documents refer to documents specifying an architecture of the external systems, types of the external systems, an interface to the external systems, the functionality provided by each of the external systems, and a protocol used for communication between the external systems and the core system of the cloud management platform.

As used herein, a computer resource is defined as a hardware component that is accessible by a computer system. In one embodiment, computer resources include central processing units, memory, and storage space. As used herein, the phrase "computer resources of external systems" refers to computer resources that are accessible by the external systems.

As used herein, onboarding is defined as initiating a tenant's use of a cloud management platform in a cloud computing environment. Onboarding includes the tenant creating its own user account on the cloud management platform and starting to use the functions and services provided by the cloud management platform.

As used herein, offboarding is defined as ending a tenant's use of a cloud management platform by disabling or removing the tenant's user account on the cloud management platform as well as de-provisioning the resources requested.

As used herein, scaling out is defined as increasing computer resources of an external system. Scaling out can allow the external system to successfully manage an increasing workload.

As used herein, scaling in is defined as decreasing computer resources of an external system. Scaling in can allow the external system to successfully manage a decreasing workload in an efficient manner.

As used herein, the term "scaling" refers to scaling in or scaling out computer resources of an external system.

Figure 1:
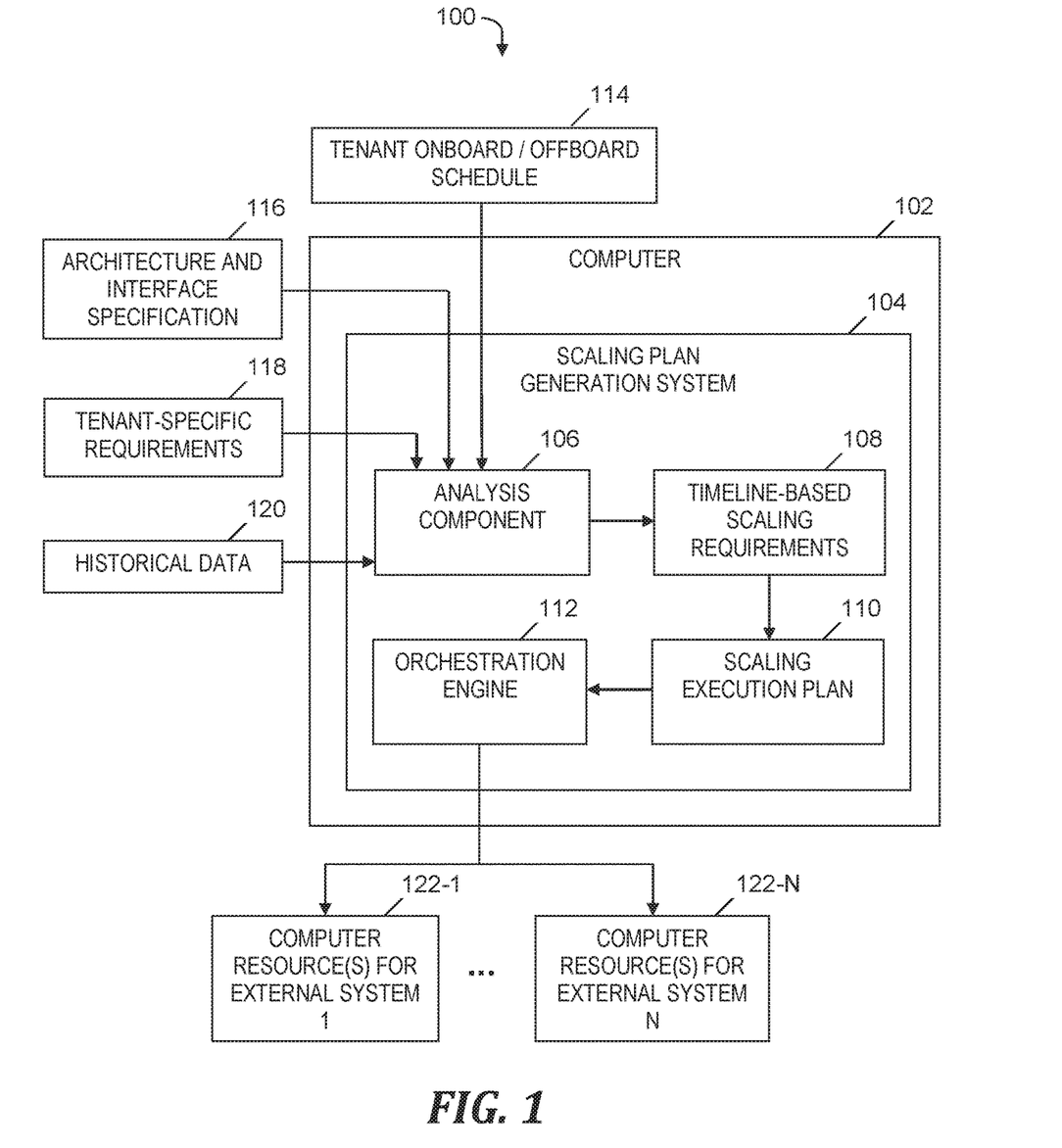
FIG. 1 is a block diagram of a system for generating a scaling plan for external systems during onboarding and offboarding of multiple cloud tenants, in accordance with embodiments of the present invention.

As used herein, an external system is defined as a backend dependent system associated with a core system of a cloud management platform. In one embodiment, the external systems are System for Generating a Scaling Plan for External Systems FIG. 1 is a block diagram of a system for generating a scaling plan for external systems during onboarding and offboarding of multiple cloud tenants (also referred to herein as customers), in accordance with embodiments of the present invention. System 100 includes a computer 102, which executes a software-based scaling plan generation system 104, which includes an analysis component 106, which generates timeline-based scaling requirements 108 for computer resources of external systems (i.e., systems external to a cloud management platform). Although multiple external systems are coupled to the cloud management platform, the tenants of the cloud management platform interact with respective one or more external systems included in the multiple external systems. Analysis component 106 proactively generates the timeline-based scaling requirements 108 prior to an actual workload being generated. Scaling plan generation system 104 uses the timeline-based scaling requirements 108 to generate a scaling execution plan 110. Herein, a scaling execution plan is also referred to simply as a scaling plan. Timeline-based scaling requirements 108 specifies the kind of external system being scaled and whether the scaling is scaling in or scaling out. Scaling execution plan 110 adds more detail to the timeline-based scaling requirements 108 by specifying a timeline indicating dates and times of scheduled onboarding and/or offboarding, and changes in workloads associated with the external systems, where the changes in the workloads are predicted to result from the onboarding and the offboarding. Scaling plan generation system 104 also includes an orchestration engine 112 that executes scaling execution plan 110 to trigger scaling of computer resources of external systems.

Analysis component 106 receives as input tenant onboard/offboard schedule 114 (i.e., a schedule for completing an onboarding of a cloud tenant or an offboarding of the cloud tenant). Analysis component 106 can receive one or more onboard/offboard schedules (not shown) for one or more other cloud tenants.

Analysis component 106 also receives as input an architecture and interface specification 116, tenant-specific requirements 118, and historical data 120. In one embodiment, the architecture and interface specification 116 include a specification of an architecture and an interface required for onboarding a tenant in the cloud computing environment. In one embodiment, tenant-specific requirements 118 include requirements for onboarding a first set of one or more tenants and other requirements for offboarding a second set of one or more tenants.

In one embodiment, historical data 120 includes data describing prior behavior of tenants, where the behavior of a given tenant includes a selection of the features by the given tenant selects when onboarding, where the selected features result in a particular workload associated with the onboarding and offboarding of the given tenant. In one embodiment, historical data includes past workload data of tenants, past onboarding data, and testing data from a simulation of customer onboarding.

Analysis component 106 uses the aforementioned input to predict workloads of computer resource(s) 122-1, . . . , computer resource(s) 122-N of external system 1, . . . , external system N, respectively, where N is an integer greater than one, where each workload is associated with an onboarding or offboarding of a tenant.

For example, a given tenant creates N virtual machines and performs a secondary operation when onboarding. A pattern of creating numbers of virtual machines that are similar to N and performing the secondary operation when onboarding is exhibited by multiple tenants and that pattern is identified by analysis component 106 and is included in historical data 120. Analysis component 106 uses the aforementioned pattern stored in historical data 120 to predict an upcoming workload of a scheduled onboarding or offboarding. Analysis component 106 uses the predicted upcoming workload as a basis for determining timeline-based scaling requirements 108 for the scheduled onboarding or offboarding.

Orchestration engine 112 executes scaling execution plan 110 to scale computer resource(s) 122-1, . . . , computer resource(s) 122-N.

Figure 2:
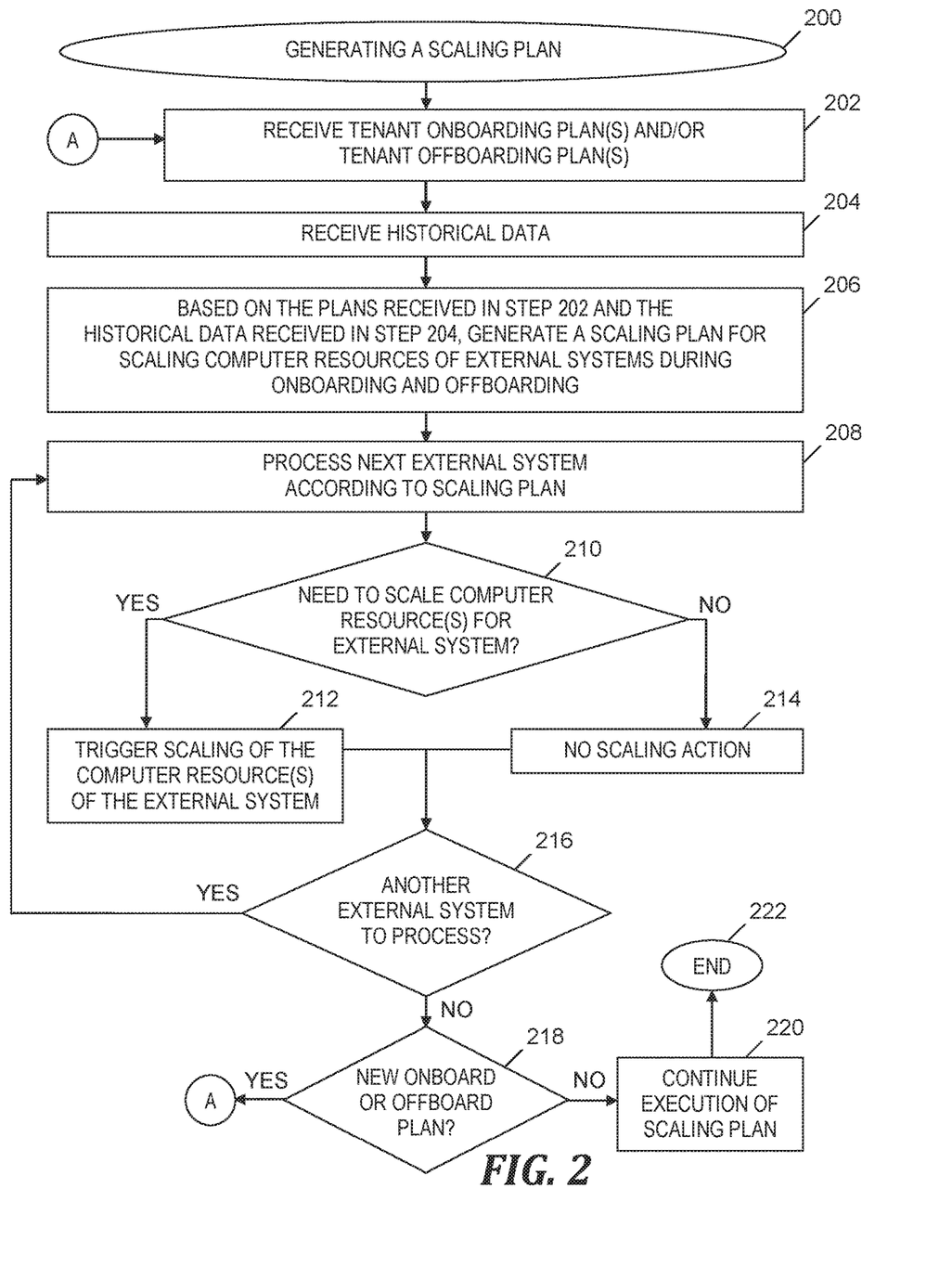
FIG. 2 is a flowchart of a process of generating a scaling plan for external systems during onboarding and offboarding of multiple cloud tenants, where the process is implemented in the system of FIG. 1, in accordance with embodiments of the present invention.
Figure 3:
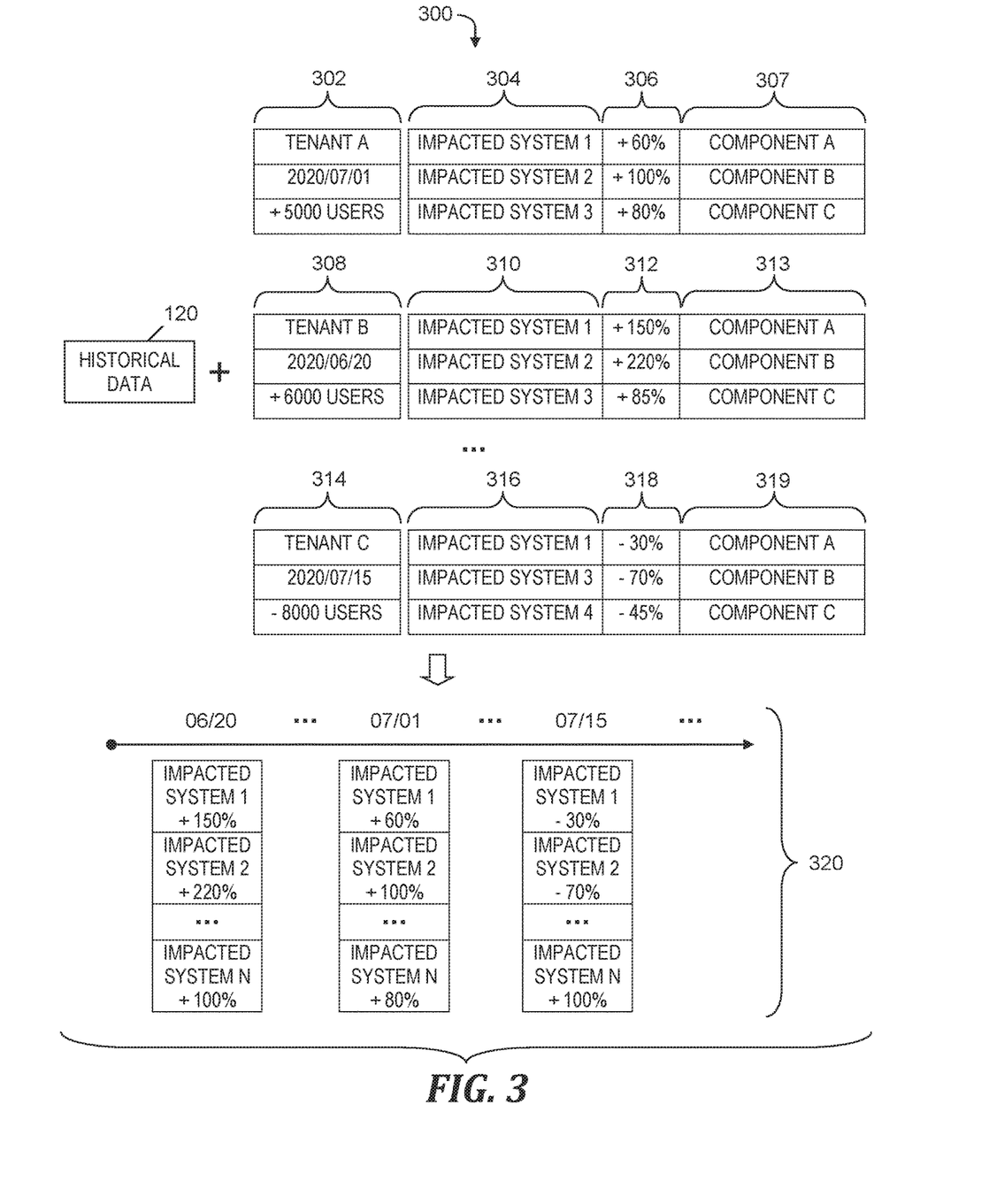
FIG. 3 is an example of workload estimation in a generation of a scaling plan for external systems using the process of FIG. 2, in accordance with embodiments of the present invention.
Figure 4:
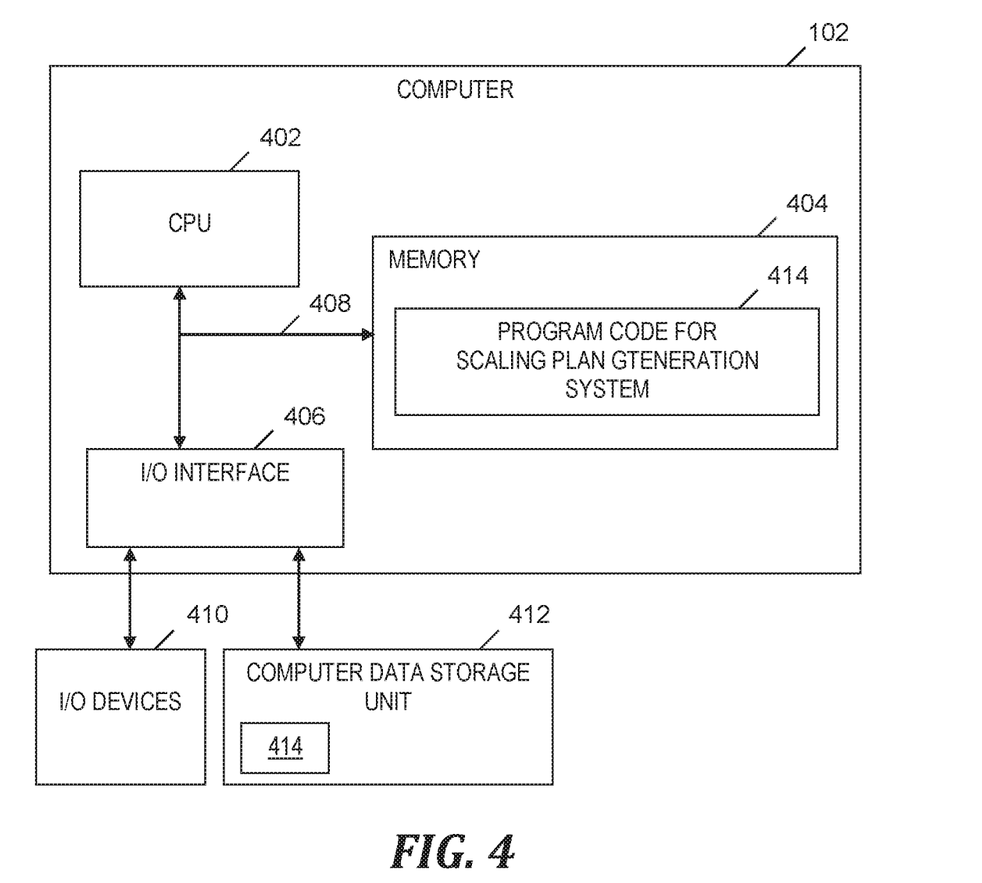
FIG. 4 is a block diagram of a computer included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Generating a Scaling Plan for External Systems

FIG. 2 is a flowchart of a process of generating a scaling plan for external systems during onboarding and offboarding of multiple cloud tenants, where the process is implemented in the system of FIG. 1, in accordance with embodiments of the present invention. The process of FIG. 2 starts at step 200. In step 202, scaling plan generation system 104 (see FIG. 1) receives tenant onboarding plan(s), tenant offboarding plan(s), or a combination of tenant onboarding plan(s) and tenant offboarding plan(s). The tenant onboarding plan(s) are plan(s) for onboarding a first set of one or more tenants of a cloud computing environment. The tenant offboarding plan((s) are plan(s) for offboarding a second set of one or more tenants of the cloud computing environment. In one embodiment, each of the plans received in step 202 include tenant onboard/offboard schedule 114 (see FIG. 1), an architecture and interface specification 116 (see FIG. 1), and tenant-specific requirements 118 (see FIG. 1).

In step 204, scaling plan generation system 104 (see FIG. 1) receives historical data 120 (see FIG. 1) about prior behavior of tenants of the cloud computing environment.

In step 206, based on the plans received in step 202 and the historical data 120 (see FIG. 1) received in step 204, scaling plan generation system 104 (see FIG. 1) generates the timeline-based scaling requirements 108 (see FIG. 1) and scaling execution plan 110 (see FIG. 1) which specifies a plan for scaling computer resource(s) 122-1, . . . , computer resource(s) 122-N (see FIG. 1) for external systems during onboarding and offboarding. In step 206, scaling plan generation system 104 (see FIG. 1) predicts an estimated workload for scheduled onboarding or offboarding and maps the predicted workload to an external system and to the tenant associated with the onboarding or offboarding.

Scaling plan generation system 104 (see FIG. 1) combines multiple changes for a single computer resource, where the multiple changes are associated with respective multiple tenants. In one embodiment, the combining of the multiple changes for a single computer resource is adding the multiple changes together. For example, on Date D, onboarding is scheduled for a Customer A that includes adding 5000 new users. Based on the scheduled onboarding and features selected by Customer A, scaling plan generation system 104 (see FIG. 1) predicts an increased workload on External Systems 1, 2, and 3. Furthermore, based on the current workload on External Systems 1, 2, and 3, and the predicted increased workload, scaling plan generation system 104 (see FIG. 1) determines an increase of 15% for computer resource A and an increase of 20% for computer resource B as part of scaling requirements 108 (see FIG. 1) and scaling execution plan 110 (see FIG. 1). Furthermore, on Date D, offboarding is scheduled for a Customer B which includes deactivating 8000 users and impacts External System 2. Based on the scheduled offboarding, scaling plan generation system 104 (see FIG. 1) predicts a decreased workload on External System 2. Based on the current workload on External System 2 and the predicted decreased workload associated with the offboarding of Customer B, scaling plan generation system 104 (see FIG. 1) recommends a decrease of 30% for computer resource B as part of scaling requirements 108 (see FIG. 1) and scaling execution plan 110 (see FIG. 1). For computer resource B, there is a 20% increase (i.e., +20%) recommended to address the onboarding of Customer A and a 30% decrease (i.e., −30%) recommended to address the offboarding of Customer B. For the scaling execution plan 110 (see FIG. 1), scaling plan generation system 104 combines +20% and −30% (i.e., 20%+−30%=−10%) to determine that computer resource B should decrease by 10% to address both the onboarding of Customer A and the offboarding of Customer B.

In step 208, scaling plan generation system 104 (see FIG. 1) processes a next external system selected from multiple external systems, where the processing is in accordance with scaling execution plan 110 (see FIG. 1). In the first performance of step 208, scaling plan generation system 104 (see FIG. 1) processes a first external system selected from the multiple external systems. In subsequent performance(s) of step 208 as described below, scaling plan generation system 104 (see FIG. 1) processes respective other external system(s) included in the multiple external systems.

In step 210, scaling plan generation system 104 (see FIG. 1) determines whether there is a need to scale computer resource(s) (e.g., computer resource(s) 122-1 in FIG. 1) for the external system being processed. Scaling plan generation system 104 (see FIG. 1) determines the need for scaling (also referred to herein as a scaling action) in step 210 based on scaling execution plan 110 (see FIG. 1).

If scaling plan generation system 104 (see FIG. 1) determines in step 210 that there is a need to scale computer resource(s) of the external system, then the Yes branch of step 210 is followed and step 212 is performed.

In step 212, orchestration engine 112 (see FIG. 1) triggers scaling of the computer resource(s) of the external system being processed at a date and a time indicated by the timeline indicated by the scaling execution plan 110 (see FIG. 1). In one embodiment, the scaling in step 212 is automatic and includes scaling out virtual machines, containers, or clusters of containers. In another embodiment, the scaling in step 212 includes a manual addition of computer resources, such as servers and memory.

Returning to step 210, if scaling plan generation system 104 (see FIG. 1) determines that there is no need to scale computer resource(s) of the external system, then the No branch of step 210 is followed, scaling plan generation system 104 (see FIG. 1) determines that a triggering of the scaling action is not to be performed for the external system, and step 214 is performed, which indicates that scaling plan generation system 104 (see FIG. 1) performs no scaling action for the external system being processed.

Step 216 follows step 212 and step 214. In step 216, scaling plan generation system 104 (see FIG. 1) determines whether another external system remains to be processed by step 208. If scaling plan generation system 104 (see FIG. 1) determines in step 216 that another external system remains to be processed by step 208, the Yes branch of step 216 is followed and the process of FIG. 2 loops to a subsequent performance of step 208, which processes a next external system selected from the multiple external systems.

If scaling plan generation system 104 (see FIG. 1) determines in step 216 that there are no other external systems remaining to be processed in step 208, then the No branch of step 216 is followed and step 218 is performed.

In step 218, scaling plan generation system 104 (see FIG. 1) determines whether a new onboarding plan or a new offboarding plan for a cloud tenant is available for processing. If scaling plan generation system 104 (see FIG. 1) determines in step 218 that there is a new onboarding or offboarding plan available for processing, then the Yes branch of step 218 is followed and the process of FIG. 2 loops back to step 202, in which scaling plan generation system 104 (see FIG. 1) receives the new onboarding or offboarding plan for the tenant.

If scaling plan generation system 104 (see FIG. 1) determines in step 218 that there is no new onboarding or offboarding plan, then the No branch of step 218 is followed and step 220 is performed.

In another embodiment, step 218 is expanded to also include a determination whether a previously processed onboarding or offboarding plan for an existing tenant has been modified by the existing tenant. If scaling plan generation system 104 (see FIG. 1) determines that the onboarding or offboarding plan for an existing tenant has been modified, then the process of FIG. 2 loops back to step 202, in which scaling plan generation system 104 (see FIG. 1) receives the modified onboarding or offboarding plan.

In step 220, scaling plan generation system 104 (see FIG. 1) continues execution of scaling execution plan 110 (see FIG. 1) by repeatedly performing the loop that begins at step 208 for the entire timeline on which the scaling requirements 108 (see FIG. 1) are based. After execution of the scaling execution plan 110 (see FIG. 1) is completed, the process of FIG. 2 ends at step 222.

After completing the processing of the external systems by the process of FIG. 2, the triggering of the scaling for the computer resources of the external systems at the dates and times indicated by the timeline ensures that a performance of a cloud management platform in the cloud computing environment exceeds a first threshold of performance and a user experience associated with the cloud management platform exceeds a second threshold of user experience.

In one embodiment, over time, scaling plan generation system 104 determines or receives additional customer behavior data and customer usage data, which is stored in historical data 120 (see FIG. 1). By using this additional amount of customer behavior and usage data, scaling plan generation system 104 (see FIG. 1) determines that users from different customers of various industry sections and/or domains have different preferences and/or behavior patterns for using functions during onboarding and/or offboarding. Scaling plan generation system 104 (see FIG. 1) uses the determination of the preferences and behavior patterns being associated with the customers of particular industry sections and/or domains to make more fine-grained (i.e., more precise) predictions of an estimated workload in step 206 and a more fine-grained scaling execution plan in terms of a workload increase/decrease on the timeline for one or more of the external systems. For example, scaling plan generation system 104 (see FIG. 1) uses a historical data-based determination of an hourly pattern of usage of functions for onboarding and offboarding by customers in industry domain D to generate an hourly-based increase or decrease in workload for some of the external systems in response to processing an onboarding plan or an offboarding plan for a particular customer that is also in industry domain D.

EXAMPLE

FIG. 3 is an example 300 of workload estimation included in a generation of a scaling plan for external systems using the process of FIG. 2, in accordance with embodiments of the present invention. Example 300 includes an onboarding plan 302 of a cloud tenant. Onboarding plan 302 identifies the cloud tenant (i.e., "TENANT A") associated with the onboarding plan, the date (i.e., "2020/07/01") on which the onboarding is scheduled to take place, and the number of users (i.e., "5000 USERS") that are to be added to a core system of the cloud computing environment. Onboarding plan 302 is an example of a tenant onboarding plan received in step 202 (see FIG. 2).

Example 300 includes a list of external systems 304 (i.e., "IMPACTED SYSTEM 1," "IMPACTED SYSTEM 2," and "IMPACTED SYSTEM 3") that are to be impacted by onboarding plan 302.

Example 300 includes estimated percentage amounts 306 (i.e., +60%, +100%, and +80%) of changes in workloads (also referred to herein as workload change percentages) which are (i) mapped to a list of components 307 (i.e., "COMPONENT A," "COMPONENT B," and "COMPONENT C") affected by the change in the workload and (ii) mapped to the list of external systems 304. The aforementioned components are, for example, an active directory, a configuration management database, or an Internet Protocol address management component.

Example 300 also includes an onboarding plan 308 of a second cloud tenant. Onboarding plan 308 identifies the cloud tenant (i.e., "TENANT B") associated with the onboarding plan, the date (i.e., "2020/06/20") on which the onboarding is scheduled to take place, and the number of users (i.e., "6000 USERS") that are to be added to the core system. Onboarding plan 308 is an example of a tenant onboarding plan received in step 202 (see FIG. 2).

Example 300 also includes: (1) a list of external systems 310 (i.e., "IMPACTED SYSTEM 1," "IMPACTED SYSTEM 2," and "IMPACTED SYSTEM 3") that are to be impacted by onboarding plan 308; (2) estimated percentage amounts 312 (i.e., +150%, +220%, and +85%) of changes in workloads; and (3) a list of components 313 (i.e., "COMPONENT A," "COMPONENT B," and "COMPONENT C"). In step 206 (see FIG. 2), scaling plan generation system 104 (see FIG. 1) estimates the percentage amounts 312 based on the onboarding plan for TENANT B and historical data 102, and maps the percentage amounts 312 to the list of external systems 310 and to the list of components 313.

Example 300 also includes an offboarding plan 314 of a third cloud tenant. Offboarding plan 314 identifies the cloud tenant (i.e., "TENANT C") associated with the offboarding plan, the date (i.e., "2020/07/15") on which the offboarding is scheduled to take place, and the number of users (i.e., "8000 USERS") whose user accounts are to be deleted from the core system. Offboarding plan 314 is an example of a tenant offboarding plan received in step 202 (see FIG. 2).

Example 300 also includes: (1) a list of external systems 316 (i.e., "IMPACTED SYSTEM 1," "IMPACTED SYSTEM 3," and "IMPACTED SYSTEM 4") that are to be impacted by offboarding plan 314; (2) estimated percentage amounts 318 (i.e., −30%, −70%, and −45%) of changes in workloads; and (3) a list of components 319 (i.e., "COMPONENT A," "COMPONENT B," and "COMPONENT C"). In step 206 (see FIG. 2), scaling plan generation system 104 (see FIG. 1) estimates the percentage amounts 318 based on the offboarding plan for TENANT C and historical data 102, and maps the percentage amounts 318 to the list of external systems 316 and to the list of components 319.

For each tenant's onboarding or offboarding plan, scaling plan generation system 104 (see FIG. 1) in step 206 (see FIG. 2) (1) estimates the workload change percentages that will result from implementing the onboarding or offboarding plan and (2) maps the workload change percentages to respective external systems and to components. The estimation of each workload change percentage is based on historical data 102 combined with an onboarding plan or an offboarding plan. As one example shown in FIG. 3, scaling plan generation system 104 (see FIG. 1) estimates that the onboarding plan for TENANT A will result in a 60% increase in workload for COMPONENT A in IMPACTED SYSTEM 1. As another example shown in FIG. 3, scaling plan generation system 104 (see FIG. 1) estimates that the offboarding plan for TENANT C will result in a 70% decrease in workload for COMPONENT B in IMPACTED SYSTEM 3.

Example 300 includes a timeline 320 generated by scaling plan generation system 104 (see FIG. 1) in step 206 (see FIG. 2). Timeline 320 includes dates (i.e., 06/20, 07/01, and 07/15) and the percentage increase or decrease in computer resource(s) that is estimated for each impacted system on each of the dates. For example, as shown in timeline 320, the onboarding and offboarding plans that are scheduled for 07/01, which includes the onboarding plan for TENANT A as discussed above, are estimated to require a 60% increase in computer resources of IMPACTED SYSTEM 1.

Computer System

FIG. 4 is a block diagram of a computer 102 included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for a system that includes scaling plan generation system 104 (see FIG. 1) to perform a method of generating a scaling plan for external systems, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to generate a scaling plan for external systems. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes tenant onboard/offboard schedule 114 (see FIG. 1), architecture and interface specification 116 (see FIG. 1), tenant-specific requirements 118 (see FIG. 1), and historical data 120 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to generating a scaling plan for external systems. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to generate a scaling plan for external systems. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of generating a scaling plan for external systems.

While it is understood that program code 414 for generating a scaling plan for external systems may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of generating a scaling plan for external systems. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
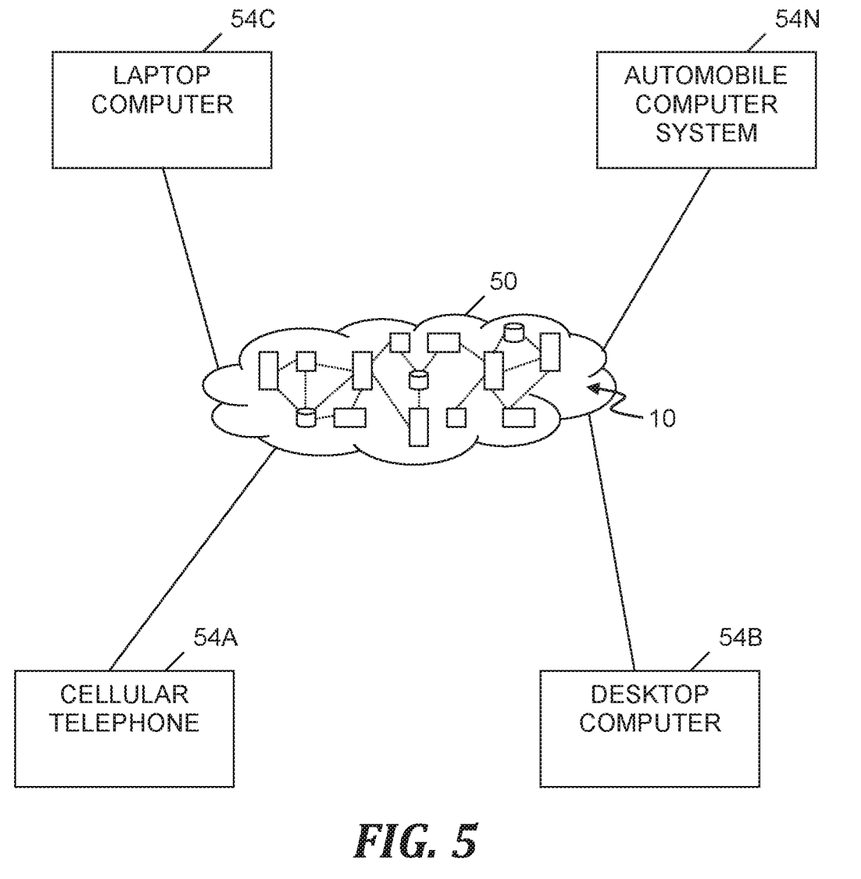
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
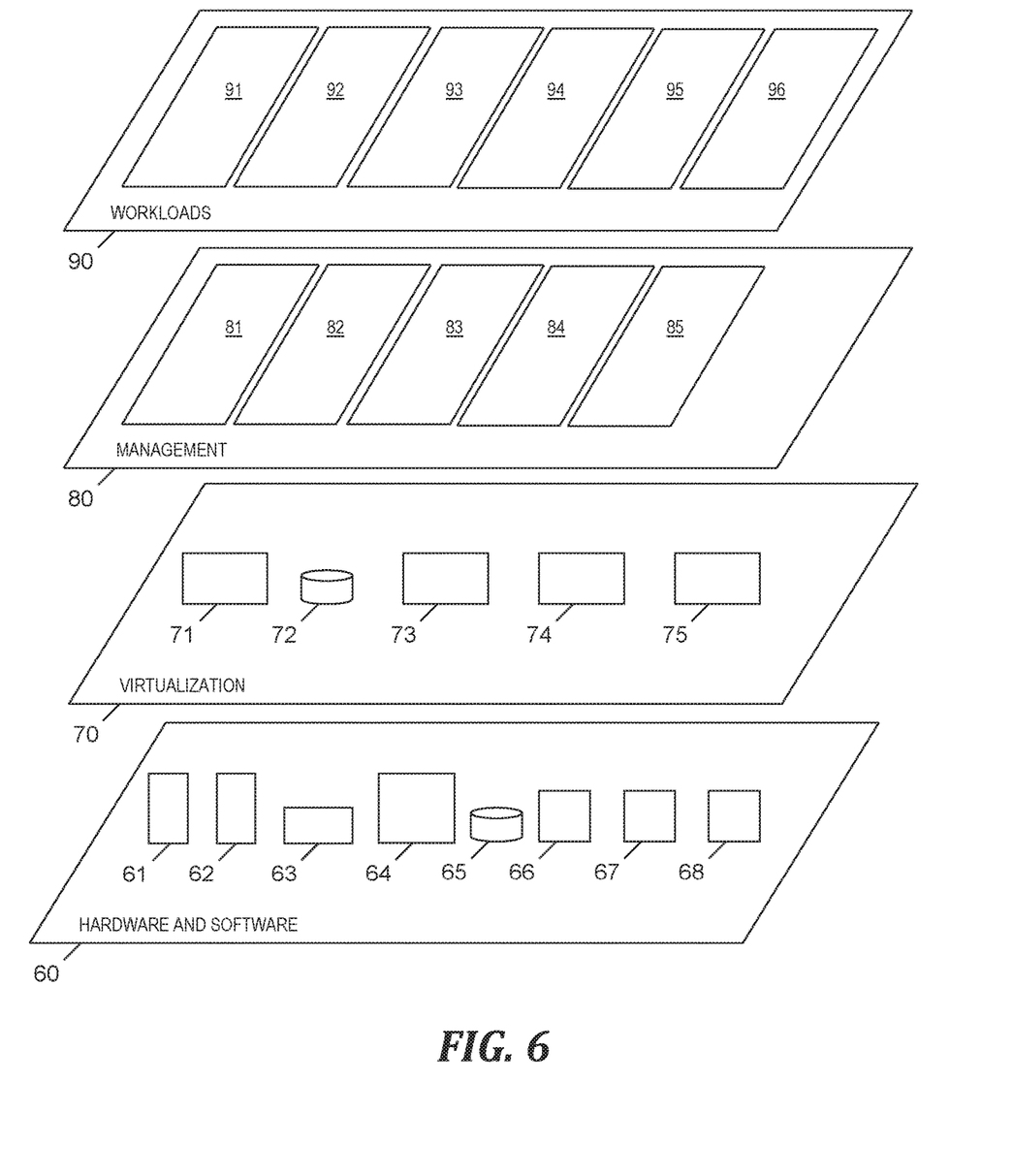
FIG. 6 depicts abstraction model layers provided by the cloud computing environment of FIG. 5, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources of which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scaling plan generation 96.

What is claimed is:

1. A method of generating a scaling plan, the method comprising:
   receiving, by one or more processors, plans for onboarding first one or more tenants of a cloud computing environment and offboarding second one or more tenants of the cloud computing environment;
   receiving, by the one or more processors, historical data about behavior of tenants of the cloud computing environment;
   based on the received plans for the onboarding and the offboarding and based on the historical data, generating, by the one or more processors, a scaling plan for scaling computer resources of external systems during the onboarding and the offboarding, the scaling plan specifying a timeline indicating dates and times at which changes in workloads associated with the external systems are required for the onboarding and the offboarding;
   based on the scaling plan, determining, by the one or more processors, that a scaling is needed for one or more computer resources of an external system included in the external systems; and
   in response to the determining that the scaling is needed, triggering, by the one or more processors, the scaling for the one or more computer resources of the external system at a date and a time indicated by the timeline.

2. The method of claim 1, further comprising repeating steps of:
   determining, by the one or more processors, whether one or more scaling actions are required for respective one or more other external systems included in the external systems; and
   if a scaling action is determined to be required for a given external system included in the one or more other external systems, triggering, by the one or more processors, the scaling action according to the timeline, or if the scaling action is determined to be not required for the given external system, determining, by the one or more processors, that a triggering of the scaling action is not to be performed,
   until no external system included in the one or more other external systems remains unprocessed by the determining whether the one or more scaling actions are required.

3. The method of claim 1, further comprising:
   subsequent to the triggering the scaling for the one or more computer resources of the external system, receiving, by the one or more processors, a new plan for onboarding or offboarding a tenant of the cloud computing environment;

receiving, by the one or more processors, other historical data about behavior of the tenant;

based on the received new plan for the onboarding and the offboarding of the tenant and based on the other historical data, generating, by the one or more processors, a second scaling plan for scaling the computer resources of the external systems during the onboarding or the offboarding of the tenant; and based on the second scaling plan, determining, by the one or more processors, that a scaling is needed for one or more computer resources of a second external system included in the external systems.

4. The method of claim 1, wherein the triggering the scaling for the one or more computer resources of the external system at the date and the time indicated by the timeline includes ensuring a performance of a cloud management platform in the cloud computing environment exceeds a first threshold and a user experience associated with the cloud management platform exceeds a second threshold.

5. The method of claim 1, wherein the plans for the onboarding and the offboarding include a schedule for completing the onboarding and the offboarding.

6. The method of claim 1, wherein the plans for the onboarding and the offboarding include onboarding requirements of the first one or more tenants and offboarding requirements of the second one or more tenants.

7. The method of claim 1, wherein the plans for the onboarding and the offboarding include a specification of an architecture and an interface of one or more external systems required for onboarding a tenant of the cloud computing environment.

8. The method of claim 1, further comprising the step of:

providing at least one support service for at least one of creating, integrating, hosting, maintaining, and deploying computer readable program code in the computer, the program code being executed by a processor of the computer to implement the receiving the plans for the onboarding and the offboarding, the receiving the historical data, the generating the scaling plan, the determining that the scaling is needed for the one or more computer resources of the external system, and the triggering the scaling for the one or more computer resources.

9. A computer program product comprising:

a computer readable storage medium having computer readable program code stored on the computer readable storage medium, the computer readable program code being executed by a central processing unit (CPU) of a computer system to cause the computer system to perform a method comprising:

the computer system receiving plans for onboarding first one or more tenants of a cloud computing environment and offboarding second one or more tenants of the cloud computing environment;

the computer system receiving historical data about behavior of tenants of the cloud computing environment;

based on the received plans for the onboarding and the offboarding and based on the historical data, the computer system generating a scaling plan for scaling computer resources of external systems during the onboarding and the offboarding, the scaling plan specifying a timeline indicating dates and times at which changes in workloads associated with the external systems are required for the onboarding and the offboarding;

based on the scaling plan, the computer system determining that a scaling is needed for one or more computer resources of an external system included in the external systems; and in response to the determining that the scaling is needed, the computer system triggering the scaling for the one or more computer resources of the external system at a date and a time indicated by the timeline.

10. The computer program product of claim 9, wherein the method further comprises repeating steps of:

the computer system determining whether one or more scaling actions are required for respective one or more other external systems included in the external systems; and if a scaling action is determined to be required for a given external system included in the one or more other external systems, the computer system triggering the scaling action according to the timeline, or if the scaling action is determined to be not required for the given external system, the computer system determining that a triggering of the scaling action is not to be performed, until no external system included in the one or more other external systems remains unprocessed by the determining whether the one or more scaling actions are required.

11. The computer program product of claim 9, wherein the method further comprises:

subsequent to the triggering the scaling for the one or more computer resources of the external system, the computer system receiving a new plan for onboarding or offboarding a tenant of the cloud computing environment;

the computer system receiving other historical data about behavior of the tenant;

based on the received new plan for the onboarding and the offboarding of the tenant and based on the other historical data, the computer system generating a second scaling plan for scaling the computer resources of the external systems during the onboarding or the offboarding of the tenant; and based on the second scaling plan, the computer system determining that a scaling is needed for one or more computer resources of a second external system included in the external systems.

12. The computer program product of claim 9, wherein the triggering the scaling for the one or more computer resources of the external system at the date and the time indicated by the timeline includes ensuring a performance of a cloud management platform in the cloud computing environment exceeds a first threshold and a user experience associated with the cloud management platform exceeds a second threshold.

13. The computer program product of claim 9, wherein the plans for the onboarding and the offboarding include a schedule for completing the onboarding and the offboarding.

14. The computer program product of claim 9, wherein the plans for the onboarding and the offboarding include onboarding requirements of the first one or more tenants and offboarding requirements of the second one or more tenants.

15. A computer system comprising:
a central processing unit (CPU);
a memory coupled to the CPU; and
a computer readable storage medium coupled to the CPU, the computer readable storage medium containing instructions that are executed by the CPU via the memory to implement a method comprising:
the computer system receiving plans for onboarding first one or more tenants of a cloud computing environment and offboarding second one or more tenants of the cloud computing environment;
the computer system receiving historical data about behavior of tenants of the cloud computing environment;
based on the received plans for the onboarding and the offboarding and based on the historical data, the computer system generating a scaling plan for scaling computer resources of external systems during the onboarding and the offboarding, the scaling plan specifying a timeline indicating dates and times at which changes in workloads associated with the external systems are required for the onboarding and the offboarding;
based on the scaling plan, the computer system determining that a scaling is needed for one or more computer resources of an external system included in the external systems; and
in response to the determining that the scaling is needed, the computer system triggering the scaling for the one or more computer resources of the external system at a date and a time indicated by the timeline.

16. The computer system of claim 15, wherein the method further comprises repeating steps of:
the computer system determining whether one or more scaling actions are required for respective one or more other external systems included in the external systems; and
if a scaling action is determined to be required for a given external system included in the one or more other external systems, the computer system triggering the scaling action according to the timeline, or if the scaling action is determined to be not required for the given external system, the computer system determining that a triggering of the scaling action is not to be performed,
until no external system included in the one or more other external systems remains unprocessed by the determining whether the one or more scaling actions are required.

17. The computer system of claim 15, wherein the method further comprises:
subsequent to the triggering the scaling for the one or more computer resources of the external system, the computer system receiving a new plan for onboarding or offboarding a tenant of the cloud computing environment;
the computer system receiving other historical data about behavior of the tenant;
based on the received new plan for the onboarding and the offboarding of the tenant and based on the other historical data, the computer system generating a second scaling plan for scaling the computer resources of the external systems during the onboarding or the offboarding of the tenant; and
based on the second scaling plan, the computer system determining that a scaling is needed for one or more computer resources of a second external system included in the external systems.

18. The computer system of claim 15, wherein the triggering the scaling for the one or more computer resources of the external system at the date and the time indicated by the timeline includes ensuring a performance of a cloud management platform in the cloud computing environment exceeds a first threshold and a user experience associated with the cloud management platform exceeds a second threshold.

19. The computer system of claim 15, wherein the plans for the onboarding and the offboarding include a schedule for completing the onboarding and the offboarding.

20. The computer system of claim 15, wherein the plans for the onboarding and the offboarding include onboarding requirements of the first one or more tenants and offboarding requirements of the second one or more tenants.

\* \* \* \* \*